US007516175B1

(12) United States Patent
Greene

(10) Patent No.: US 7,516,175 B1
(45) Date of Patent: Apr. 7, 2009

(54) METHOD OF ORGANIZING AND ANALYZING FIELD WARRANTY DATA

(75) Inventor: Alex Greene, Plymouth, MI (US)

(73) Assignee: Kelsey-Hayes Company, Livonia, MI (US)

( * ) Notice: Subject to any disclaimer, the term of this patent is extended or adjusted under 35 U.S.C. 154(b) by 997 days.

(21) Appl. No.: 10/412,141

(22) Filed: Apr. 11, 2003

(51) Int. Cl.
*G06F 15/16* (2006.01)

(52) U.S. Cl. .................. 709/201; 709/217; 709/225; 709/226; 709/229; 705/1; 705/10; 705/11; 705/29; 705/35

(58) Field of Classification Search .............. 709/217, 709/225, 226, 229; 705/1, 10, 11, 29, 33, 705/35
See application file for complete search history.

(56) References Cited

U.S. PATENT DOCUMENTS

| | | | |
|---|---|---|---|
| 6,393,417 B1 * | 5/2002 | De Le fevre | 707/6 |
| 6,393,432 B1 | 5/2002 | Flansburg et al. | |
| 6,609,050 B2 * | 8/2003 | Li | 701/29 |
| 6,651,063 B1 * | 11/2003 | Vorobiev | 707/10 |
| 6,952,680 B1 * | 10/2005 | Melby et al. | 705/28 |
| 2001/0032103 A1 | 10/2001 | Sinex | |
| 2001/0051884 A1 | 12/2001 | Wallis et al. | |
| 2002/0087578 A1 | 7/2002 | Vroman | |
| 2002/0116163 A1 | 8/2002 | Loveland | |
| 2002/0138311 A1 | 9/2002 | Sinex | |
| 2005/0086239 A1 * | 4/2005 | Swann et al. | 707/100 |

OTHER PUBLICATIONS

Information Builders Warranty Solution [email]. Information Builders, Inc. [retrieved on Sep. 21, 2001].
Improved Profitability Through Better Warranty Management [email]. Information Builders, Inc. 2001 [retrieved on Sep. 21, 2001].
Entigo Sales Brochere [email], Entigo Corporation (Aug. 2001) [retrieved on Dec. 5, 2001].
Porter-Kuchay et al, Entigo Selected by Carrier Corporation for Warranty Claims Management Private Exchange [email], Entigo Corporation (Oct. 22, 2001) [retrieved on Dec. 5, 2001].
Maczka, et al., SAS and Entigo Introduce Intelligent Warranty Solution [email], SAS Institute, Inc. News Release (Nov. 9, 2001) [retrieved on Dec. 5, 2001].
Porter-Kuchay et al, Entigo and SAS Combine Warranty Products to Solve Billion Dollar Industry Problem [email], Entigo Corporation (Nov. 12, 2001) [retrieved on Dec. 5, 2001].
Porter-Kuchay et al, Entigo Named Company to Watch by Internet World Magazine [email], Entigo Corporation (Nov. 13, 2001) [retrieved on Dec. 5, 2001].

* cited by examiner

*Primary Examiner*—John Follansbee
*Assistant Examiner*—Glenford Madamba
(74) *Attorney, Agent, or Firm*—MacMillan, Sobanski & Todd, LLC

(57) ABSTRACT

A system and method for organizing and analyzing field warranty data including a warranty interface provided with warranty data from a warranty group. The warranty interface being capable of allowing a user to select prioritization data, and then displaying a list of warranty data items related to the prioritization data by relevance. The user selects a warranty data item, and then selects a dynamic report template from a list of dynamic report templates and criteria to produce an analysis report.

30 Claims, 4 Drawing Sheets

METHOD OF ORGANIZING AND ANALYZING FIELD WARRANTY DATA

BACKGROUND OF THE INVENTION

This invention relates in general to systems and methods for collecting field warranty data and in particular to systems and methods for organizing and analyzing field warranty data related to parts and the use of parts.

Information relating to warranty claims for motor vehicle parts is desirable information for many different users. For example, tracking warranty claims and data associated with the vehicle parts under warranty can be used by vehicle manufacturers for several purposes. Included purposes can be comparing the life span of similar parts, locating a part that is particularly susceptible to failure, or locating facilities that supply or manufacture defective parts. The importance of warranty information has caused private entities, government organizations, groups of employees from within an organization, or any combination thereof, to be organized into warranty groups. Warranty groups collect, maintain, and analyze data relating to part failure and parts inquiries to determine various trends in the data. The analysis information produced may be useful to a variety of users, and warranty groups may assist in the dissemination of this information to some or all of these users.

Referring now to the drawings, FIG. 1 illustrates a known system for organizing field warranty data flow, indicated generally at 10. The system 10 provides warranty data to both users 12 and warranty groups 14. The users 12 may access a warranty web site 16 to search for warranty data. The users 12 may also request warranty data from the warranty groups 14 outside of the warranty web site 16. The warranty groups 14 may access the warranty web site 16 on behalf of the users 12 or for their own data gathering purposes. Although the invention is described below as used by the users 12, it is to be understood that the warranty groups 14 may also use the warranty web site 16 in a similar manner.

The warranty web site 16 includes a user interface 18, and warranty data 19 classified by an OEM (Original Equipment Manufacturer) classification 20. The OEM classification 20 is the name of the original equipment manufacturer of the part generating the warranty data 19. The user interface 18 allows the users 12 to select the desired OEM classification 20. The user interface 18 displays a list of reports 21 containing warranty data for the selected OEM classification 20. The user interface 18 allows the users 12 to select a report 22 from a list of reports 21 available for the selected OEM classification 20. The warranty data 19 provided within the warranty web site 16 is supplied by the warranty groups 14, which receive the information from data sources 24, such as parts manufacturers or OEMs. The warranty groups 14 collect and maintain the warranty data 19 in the form of the reports 21, which are categorized and stored by the OEM classification 20. The reports 21 are disseminated by the warranty groups 14 through the warranty web site 16.

There are known methods for collecting and analyzing warranty data, such as the warranty data included in the warranty web site 16 shown in FIG. 1. FIG. 2 illustrates a flowchart for a known method of collecting and analyzing warranty data, indicated generally at 40, using a warranty web site such as the warranty web site 16.

The method 40 begins in functional block 42, where the user accesses the warranty web site 16. The user of the method 40 may be the users 12 or the warranty groups 14 as described above. The warranty web site 16 may limit access to a user within a company or organization. The warranty web site 16 may include security measures to control access to the warranty web site 16. The method 40 then advances to functional block 44.

In functional block 44, the user selects the OEM classification 20 that is related to the warranty data 19 of interest. In functional block 46, the user interface 18 of the warranty web site 16 displays a list of reports for the selected OEM classification 20. The method then advances to decision block 48. In decision block 48, the user determines if the desired report is available. If the user determines that the desired report is available, then the method transfers to functional block 50.

In functional block 50, the user selects a report 21 from the list of reports 22 for the selected OEM classification 20. The method then advances to decision block 52.

In functional block 52, the user performs an analysis of the selected report 21. The analysis performed in functional block 52 may be cumbersome. The user may integrate warranty data, including the warranty data 19 from the warranty web site 16, and warranty data from other sources. The warranty data may be in various formats, such as electronic or paper form. The warranty data may include competitive warranty rates, component warranty trends, claims, phone conversations, parts analysis, and customer satisfaction data. The desired analysis may be of a subset of the data provided in the selected report 21.

Upon completing the analysis in functional block 52, the method advances to decision block 54. In decision block 54, the user determines if additional reports are necessary to perform the desired warranty data analysis. If the user determines that no additional reports are necessary to perform the desired warranty analysis, then the method transfers to functional block 62 and exits the method. If the user determines that additional reports are necessary to perform the desired warranty analysis, then the method transfers to functional block 46. In functional block 46, the user again views the list of reports available and continues through the method as before.

Referring back to functional block 48, if the user determines that the desired report is not available from the list of reports, then the method transfers to functional block 56. In function block 56, the user can request new reports directly from the warranty group 14 associated with the warranty interface or another warranty data source (not shown) outside of the system 10. The method then advances to decision block 58 where the warranty group 14 determines if the requested report is available from the data source 24. If the requested report is available, the method transfers to functional block 60 where the user receives the requested reports from the warranty group 14. The method then returns to functional block 52, where the user analyzes the data, as described above. The user then continues through the method as before. If the requested report is not available, the method transfers to decision block 54, where the user determines if additional reports are necessary. The user then continues through the method as before.

SUMMARY OF THE INVENTION

This invention relates to a system and method for organizing and analyzing field warranty data related to parts and the use of parts.

Current systems and methods for organizing and analyzing field warranty data include static reports of warranty data. The warranty data is presented in various formats and the raw data may be difficult to extract from the report. Current methods do not allow users the ability to dynamically generate reports, nor do they include a variety of classifications associated with the warranty data. Warranty data encompassing multiple customers is also unavailable. Currently, a user must collect data from multiple sources and perform their own analysis outside of the provided warranty interface. Accordingly, it would be desirable to provide an improved system and method for organizing and analyzing field warranty data that gives users the flexibility to generate data reports with their choice of criteria to group or limit the warranty data.

The present invention contemplates a system that includes a warranty interface having warranty data items supplied by a plurality of warranty groups. The warranty interface is capable of allowing a user to select prioritization data, and then displaying a list of warranty data items related to the prioritization data by relevance. The warranty interface delivers all relevant information, including claims, technical assistance calls, and returned part analysis results for the selected warranty data item. The warranty data items available from the warranty interface include data combined from various customers by the warranty groups to allow comparisons across customers by various criteria such as product and system. The warranty data items are organized in descending order of importance, relative to the prioritization data entered by the user, for example, a plant manager might select 'plant product list' as prioritization data, a product engineer might enter 'commodity', and a sales person might enter 'customer' as the desired prioritization data.

The warranty interface then allows the user to select a warranty data item of interest from the list. The warranty interface allows a user to email a representation of the selected warranty data item to a second user to perform an analysis of the selected warranty data item. The warranty interface displays a list of dynamic report templates available for the data item selected. The warranty interface allows the user to enter criteria to dynamically modify the report template and produce an analysis report. The warranty interface allows the user to then download the analysis report, and perform further analysis with the reports and data. The warranty interface allows the user to report the lack of warranty data items, dynamic report templates, and/or dynamic report template criteria required to the warranty group of the warranty interface. The warranty interface allows the user to request that additional warranty data items, dynamic report templates, and/or dynamic report template criteria be added to the warranty interface, or generated outside of the system. The warranty interface facilitates the user's ability to circulate warranty data items, dynamic report templates, and analysis reports to other users. The system allows the user to add comments to a discussion thread, and such comments are stored categorized by related data item. These comments are maintained in the system within the warranty interface even though the data is periodically updated.

The present invention contemplates a method for using a warranty interface that is capable of allowing a user to select prioritization data. The warranty interface then displays a list of warranty data items related to the prioritization data by relevance. The warranty interface delivers all relevant information for the selected data item. The warranty data items are organized in descending order of importance, relative to the prioritization data entered by the user. The user then determines if a desired warranty data item is available from the list of warranty data items. If the desired warranty data item is not available, the user may report the lack of availability of the desired warranty data item to the warranty group. If the user desired data item is available, the user selects a warranty data item of interest from the list. The user may decide to analyze the selected warranty data item or may communicate a representation of the selected warranty data item to a second user to perform an analysis of the selected warranty data item. The second user may then enter the warranty interface and continue the method with the selected warranty data item.

The user may then select from a list of dynamic report templates available for the data item selected. If the user determines that the dynamic report templates available are adequate, the user enters criteria to dynamically modify the report template and produce an analysis report. The user may then download the analysis report, and may perform further analysis with the reports and data. If the user determines that the dynamic report templates available are inadequate, the user may report the lack of warranty data items, dynamic report templates, and/or dynamic report template criteria required to the warranty group. Additionally, or alternatively, the user may request that additional warranty data items, dynamic report templates, and/or dynamic report template criteria be added to the warranty interface, or generated outside of the web site system. The user may report deficiencies or request additional reports via an email or web form interface within the warranty interface. Additionally, throughout the process, warranty data items, dynamic report templates, and analysis reports may be circulated to other users. At any time during use of the above-described system, the user may add comments to a discussion thread, and such comments are stored categorized by related data item. These comments are maintained within the warranty interface even though the data is periodically updated.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
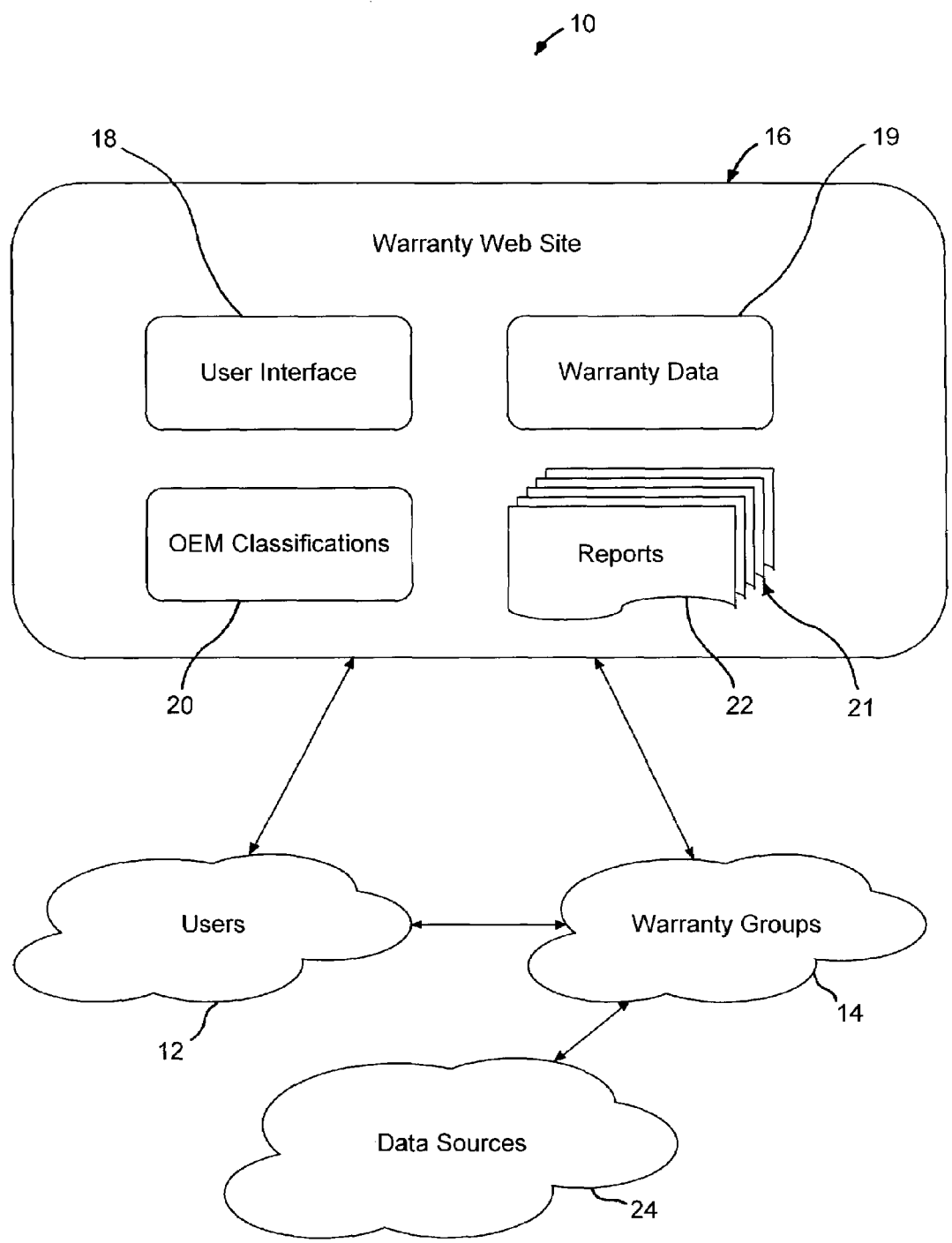
FIG. 1 is a diagram of a known system for organizing field warranty data flow.
Figure 2:
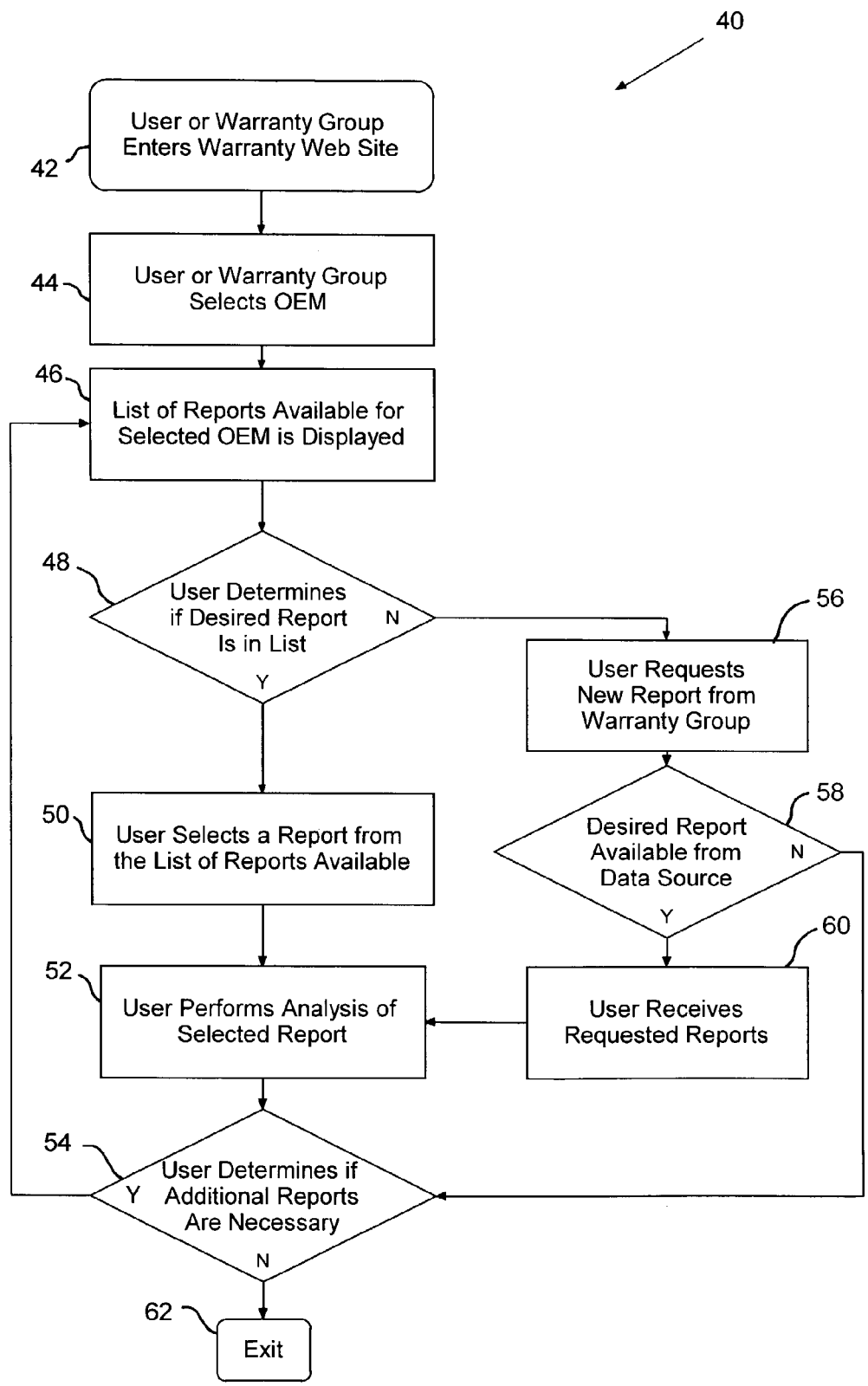
FIG. 2 is a flowchart of a known method of collecting and analyzing warranty data using the system of FIG. 1.
Figure 3:
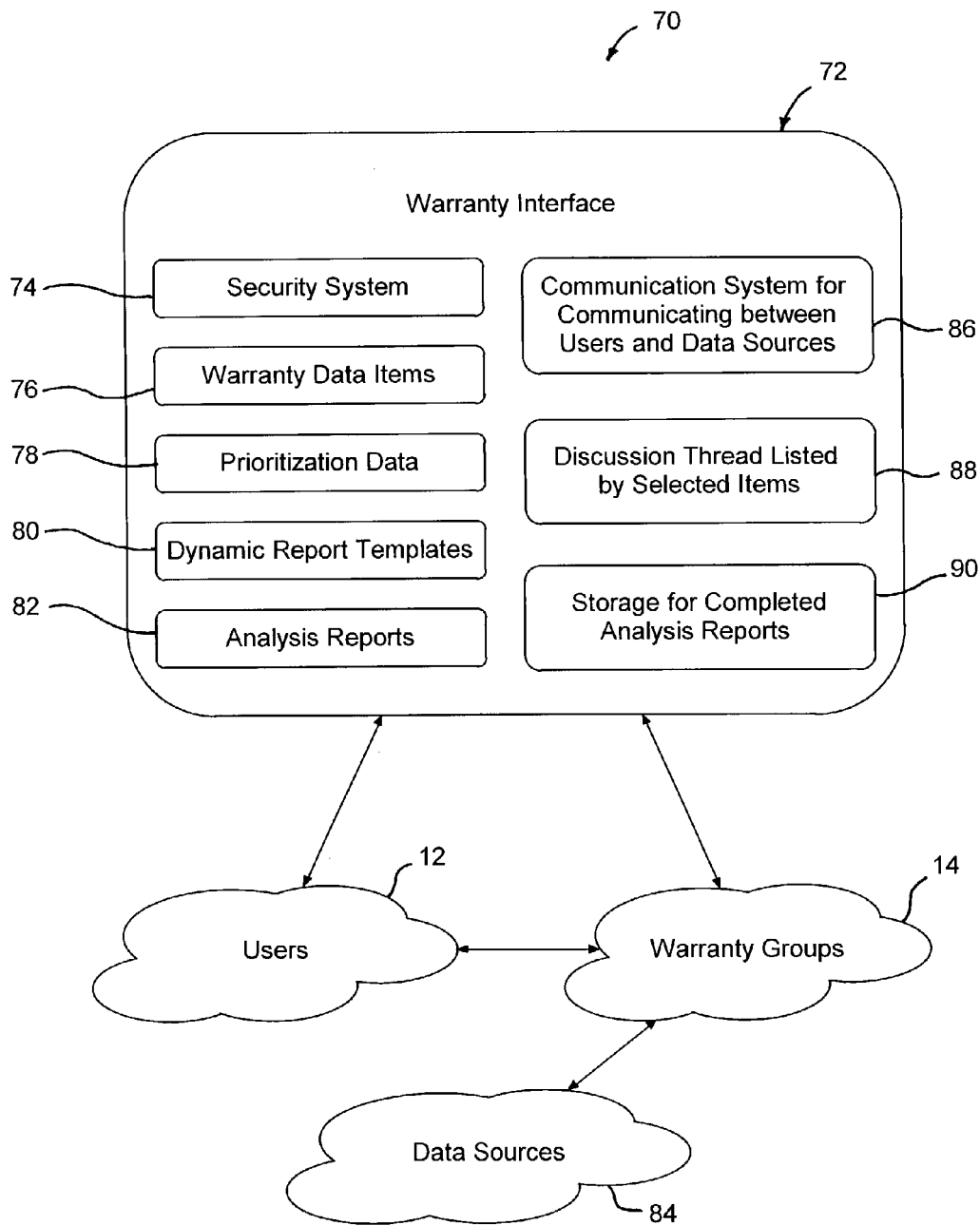
FIG. 3 is a diagram of a system for collecting and analyzing field warranty data flow in accordance with this invention.

Referring again to the drawings, FIG. 3 illustrates a system for organizing field warranty data flow, indicated generally at 70, in accordance with the present invention. Components shown in FIG. 3 that are similar to components shown in FIG. 1 have the same numerical identifiers. The system 70 provides data to both users 12 and warranty groups 14. The users 12 may access a warranty interface 72 to search for warranty data. The users 12 may also request warranty data directly from the warranty groups 14. The warranty groups 14 may access the warranty interface 72 on behalf of the users 12 or for their own data gathering purposes. Although the invention is described below as used by the users 12, it is to be understood that the warranty groups 14 may also use the warranty interface 72 in a similar manner.

The warranty groups 14 may be private entities, government organizations, a group of employees from within an organization, or any combination thereof. An organization may include multiple warranty groups 14. For example, one major OEM for vehicle chassis components has a Braking and Steering Warranty Group and an Occupant Safety Warranty Group. Each of the warranty groups 14 within an organization may include employees from within a division of an organization with similar job duties, such as safety engineers or managers. The warranty groups 14 may assist the users 12 in accessing the warranty interface 72 and the data contained therein.

The users 12 of the warranty interface 72 may be limited to those within a company or organization, although such is not required. The warranty interface 72 may also include a security system 74 for limiting and/or controlling access to the warranty interface 72. The security system 74 may limit access for selected users 12 to only a portion of the warranty interface 72. It will be appreciated that the warranty interface 72 may also be open to the public.

The warranty interface 72 is capable of displaying a list of warranty data items 76, and allowing a user to select a representation of the warranty data item 76 in any suitable manner. The warranty interface 72 also displays a list of prioritization data 78, and allows the users 12 to select a representation of the prioritization data 78 in any suitable manner. The warranty interface 72 is further capable of displaying a list of dynamic report templates 80 for a selected warranty data item 76, and allowing a user to select and modify a dynamic report template 80 to produce an analysis report 82 in any suitable format.

The warranty data items 76 included within the warranty interface 72 are generally provided, maintained, and monitored by the warranty groups 14. The warranty groups 14 may combine data from data sources 84 and organize the data to produce the warranty data items 76 for use in the system 70. The warranty groups 14 may collate and combine related data and classify data by various characteristics to produce the warranty data items 76. The warranty groups 14 may also link related data or subsets of data based on known or determined trends or criteria to produce the warranty data items 76. It is contemplated that the data sources 84 may be any source of warranty data, including a customer of warranty parts, or a consortium of customers, parts suppliers, or warranty groups, a government entity, or any combination thereof who obtain or generate warranty data. It is contemplated that the warranty groups 14 may also collect data from the data sources 84 in a standardized data format for ease in organizing the data to produce the warranty data items 76.

The warranty interface 72 also includes a communication system 86 to allow users 12 to communicate deficiencies in warranty data items 76, dynamic report templates 80, or other comments to the warranty groups 14, or to transmit requests for analysis of selected data to other users outside the system 70. The communication system 86 may be an email system or a web form including a link to a selected warranty data item in a preformatted email message, although such is not required. A discussion thread 88 is provided so that users may post and retrieve comments regarding the warranty data, such as, for example, the availability of the warranty data and trends within the warranty data. The discussion thread 88 allows the users 12 to store text data, completed analysis reports 82, or other data associated with the analysis or attempted analysis of a warranty data item included with the comments posted in the discussion thread 88. In the preferred embodiment, the discussion thread 88 associates each stored data entry with at least one of the warranty data items 76. Therefore, in the preferred embodiment, any potential data entry that is not associated with one of the existing warranty data items 76 will be communicated through the communication system 86 to the warranty groups 14. The warranty interface 72 includes a storage system 90 for storing the data of the security system 74, the warranty data items 76, the prioritization data 78, the dynamic report templates 80, completed analysis reports 82, the data of the communication system 86, and the data of the discussion thread 88.

In a preferred embodiment, the warranty interface 72 is a web site, although such is not required. The warranty interface 72 may be any combination of software and hardware. The warranty interface 72 may be posted and run on the World Wide Web, the Internet, or a private or network which may also be secure.

Figure 4:
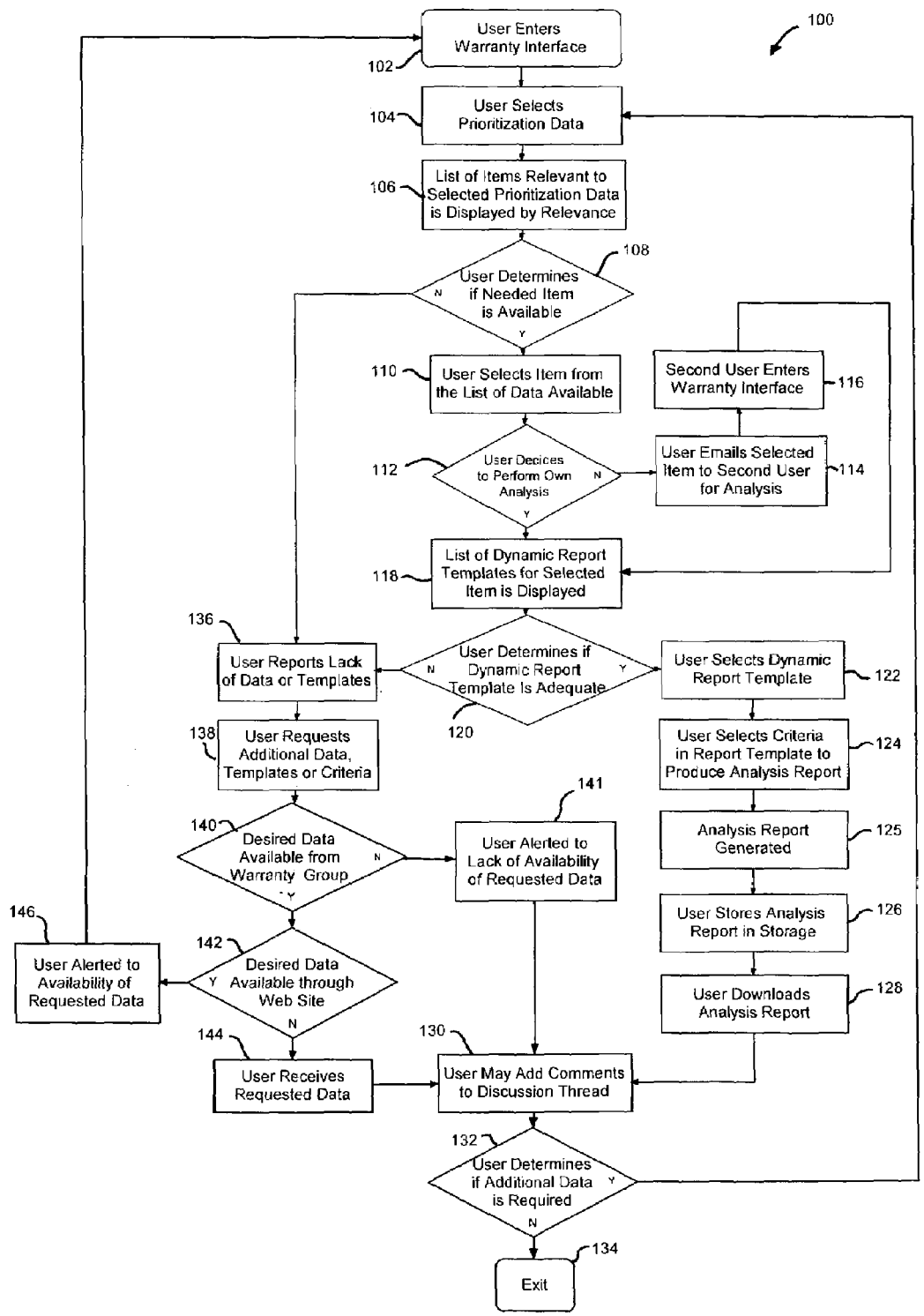
FIG. 4 is a flow chart for the operation of the system of FIG. 3, in accordance with this invention.

Referring now to FIG. 4, there is illustrated a flow chart for a method of collecting and analyzing warranty data, indicated generally at 100, in accordance with this invention. The method 100 uses a warranty interface, such as the warranty interface 72 of the warranty data flow system 70 in FIG. 3. The method 100 begins at functional block 102, where the user enters the warranty interface 72. The user of the method 100 may be the users 12 or the warranty groups 14 as described above. The method 100 then advances to functional block 104. In functional block 104, the user selects prioritization data 78 for the desired analysis using the warranty interface 72. The prioritization data 78 may be any data item associated with a warranty part. The user may select the prioritization data 78 of interest for their analysis, for example, a plant manager might select 'plant product list' as prioritization data, a product engineer might enter 'commodity', and a sales person might enter 'customer' as the desired prioritization data. The user may select multiple items of prioritization data. When multiple items are selected, the user is asked to indicate relative importance of each item. However, such ordering is optional. The method then advances to functional block 106.

In functional block 106, the warranty interface 72 displays a list of warranty data items 76 related to the selected prioritization data 78 by relevance. The list of warranty data items 76 is organized in descending order of importance, when provided, relative to the prioritization data 78 selected by the user in functional block 104. The warranty interface 72 delivers all warranty data items 76 relevant to the selected prioritization data 78, including information such as claims, technical assistance calls, and returned part analysis results that has been classified and organized by the warranty groups 14. The warranty data items 76 may be organized by the warranty groups 14 to allow comparisons across customers by various criteria such as product and system. The method then advances to the decision block 108.

In decision block 108, the user determines if the desired warranty data item 76 is available. If the user determines that the desired warranty data item 76 is available, then the method transfers to functional block 110. If the user determines that the desired warranty data item 76 is not available from the list of warranty data items 76, then the method transfers to functional block 136, the function of which will be described below. In functional block 110, the user then selects a warranty data item 76 of interest from the list of warranty data items 76 using the warranty interface 72. The method then advances to decision block 112.

In decision block 112, the user decides whether to analyze the selected warranty data item 76 himself. The user may desire that the analysis of the selected warranty data item 76 is completed, but the user may want a second user to complete the analysis, such as a co-worker or subordinate of the user. If the user decides to analyze the selected warranty data item 76 himself, the method transfers to functional block 118. If the user decides not to analyze the selected warranty data item 76 himself, the method transfers to functional block 114. In functional block 114, the user communicates the selected warranty data item 76 to a second user for analysis using the communication system 86 of the warranty interface 72, by a conventional method, such as an e-mail. The method then advances to functional block 116. In functional block 116, the second user enters the warranty interface 72. The method then returns to functional block 118 and continues for the second user as described below.

In the preferred embodiment, the second user is directed to the warranty interface 72 wherein the warranty data item 76 selected by the first user is retained and the method restarts at functional step 118 for the second user, although such is not required. It will be appreciated that alternatively, the method 100 could return to functional block 102 (not shown) and continue through the method 100 as before for the second user.

If the first user decides to perform an analysis in decision block 112, the method advances to functional block 118. In functional block 118, a list of dynamic report templates available for the selected warranty data item 76 is displayed by the warranty interface 72. The method then advances to decision block 120. In decision block 120, the user, who may be either the first or the second user from this point on, determines if the dynamic report templates available are adequate to perform the desired analysis of the selected warranty data item 76. If the user determines that the dynamic report templates available are adequate to perform the desired analysis of the selected warranty data item 76, the method transfers to functional block 122. In functional block 122, the user selects a dynamic report template 80. In functional block 124, the user selects criteria within the selected dynamic report template 80 to customize the analysis report 82 created by the dynamic report template 80. The method then advances to functional block 125.

In functional block 125, the warranty interface 72 generates the analysis report 82 using the dynamic report template 80 and criteria selected by the user. The method then advances to functional block 126.

In functional block 126, the user may store his analysis report 82 in the storage 90 of the warranty interface 72, although such is not required. At this point, the second user may forward the report to the first user (not shown), if the analysis report 82 was prepared by the second user. It is also contemplated that the analysis report 82 may automatically be stored by the warranty interface 72 when the analysis report 82 is generated by the warranty interface 72 in functional block 125. In functional block 128, the user may download the analysis report 82 created by the dynamic report template 80, although such is not required. The downloaded analysis report 82 may be used in further analysis and may be further modified. The method then advances to functional block 130.

In functional block 130, the user may add comments to the discussion thread 88, although such is not required. As described above, the discussion thread 88 may be any conventional posting system that allows the user to add text commentary that may be related to a particular warranty data item 76 or a dynamic report template 80. It is contemplated that the commentary may also be general and relate to the warranty interface 72 as a whole, or the commentary may relate to a lack of a warranty data item 76 or dynamic report template 80. In the preferred embodiment, the comments are associated with the relevant warranty data item 76 and may be listed by such relevant warranty data item 76 within the discussion thread 88, although such is not required. Therefore, in the preferred embodiment, comments that do not relate to an existing warranty data item 76, such as general commentary regarding the warranty interface 72 or the lack of a data item, should be communicated using the communication system 86 to the warranty groups 14. In another embodiment of the invention, the discussion thread 88 is primarily used to convey information relating to data analysis and data trends amongst the users 12. Additional information may be stored with the commentary in the discussion thread 88, such as the name or credentials of the user, the date, and the analysis report 82 or partial analysis. The discussion thread 88 allows the user to post commentary relating to existing comments and acts as a forum for users to discuss their issues relating to warranty data. The method then advances to decision block 132.

In decision block 132, the user determines if additional warranty data items or additional dynamic report templates are required to produce the desired analysis. In the preferred embodiment, if the user determines that additional warranty data items or additional dynamic report templates are required, the method returns to functional block 104, where the user selects prioritization data for the next list of data items to be displayed. However, it will be appreciated that the invention also may be practiced with the method 100 returning to other prior steps. The method 100 also could return to functional block 106, where a list of warranty data items 76 is displayed for the user. It is contemplated that the warranty interface 72 could store the last used prioritization data 78 and display the list of warranty data items 76 based on the previously entered prioritization data 78 when the user returns to the warranty interface.

If the user determines in decision block 132 that additional warranty data items or additional dynamic report templates are not required, the method then advances to exit block 134 and terminates.

Returning to decision block 120, if the user determines that the dynamic report templates available are not adequate to perform the desired analysis of the selected warranty data item 76, the method transfers to functional block 136. In functional block 136, the user reports the lack of available warranty data items and/or dynamic report templates necessary to produce the desired analysis report 82 to the warranty groups 14. It will be appreciated that the system 70 may be designed to direct such reports to a related one of the warranty groups 14, although such is not required. The method then advances to functional block 138. In functional block 138, the user requests additional warranty data items 76, additional dynamic report templates 80, and/or additional report template criteria options from the warranty groups 14. Again, it will be appreciated that the system 70 may be designed to direct such reports to a specific one of the warranty groups 14 that is related to the subject of the report, although such is not required. This request may be made using the communication system 86 of the warranty interface 72, although such is not required. The user may request additional data through any suitable communication system. The method then advances to decision block 140.

In decision block 140, the warranty groups 14 determine if the requested warranty data item 76 or dynamic report template 80 is available or will be made available from the warranty groups 14. If the warranty groups 14 determine that the requested warranty data item 76 or dynamic report template 80 is not available, the method transfers to functional block 141, where the user is alerted to the lack of availability of the requested warranty data item 76 or dynamic report template 80. The method then transfers to functional block 130, where the user may add comments to the discussion thread 88, and the method continues as described above.

If, in decision block 140, the warranty groups 14 determine that the requested warranty data item 76 or dynamic report template 80 is available, the method transfers to decision block 142. In decision block 142, the warranty groups 14 determine if the requested warranty data item 76 or dynamic report template 80 is available or will be made available through the warranty interface 72. The warranty groups 14 may determine that the requested warranty data item 76 was already available from the warranty interface 72, and was not properly located by the user. For example, the user may have overlooked the requested warranty data item 76 in the list of warranty data items 76 on the warranty interface 72. The warranty group 14 may also determine that although the requested warranty data item 76 was not previously available from the warranty interface 72, the requested warranty data item 76 should be available from the warranty interface 72. For example, a user may request warranty data for disc brakes manufactured by a particular supplier. The warranty groups 14 may already possess or be able to obtain this warranty data, and may determine that this data would be useful to other users of the warranty interface 72. If the warranty groups 14 determine that the requested warranty data item 76 or dynamic report template 80 will not be made available through the warranty interface 72, the method advances to functional block 144. In functional block 144, warranty groups 14 transmit the warranty data item 76 or dynamic report template 80 to the user by means outside the warranty interface 72. The method then advances to functional block 130 and continues as described above.

In decision block 142, if the warranty groups 14 determine that the requested warranty data item 76 or dynamic report template 80 will be available through the warranty interface 72, the method advances to functional block 146. In functional block 146, the user is alerted by the warranty groups 14 that the requested warranty data item 76 or dynamic report template 80 has been, or is now, available through the warranty interface 72. In the preferred embodiment, the method then returns to functional block 102, where the user enters the warranty interface 72, selects prioritization data 78 to display a list of data items, and continues as described above. It will be appreciated, however, that the invention also contemplates that the method 100 could return to other prior steps of the method. For example, the user also could return to functional block 106, where a list of warranty data items 76 is displayed for the user. It is contemplated that the warranty interface 72 could store the previously entered prioritization data 78 and automatically display the list of warranty data items 76 based on the previously entered prioritization data 78 when the user returns to the warranty interface.

While the preferred embodiment shows the user adding comments to the discussion thread 88 in functional block 130, it will be appreciated that, at any time during use of the above-described system, the user may add comments to the discussion thread 88, such comments are categorized by related warranty data item 76. The comments of the discussion thread 88 are maintained even though the data is periodically updated. It will further be appreciated that the user may check the existing comments of the discussion thread 88 at any time during the use of the above-described method.

It will also be appreciated that the user may terminate the method 100 at any step within the method 100. The user may terminate the method 100 by entering a command into the warranty interface 72, by use of the keyboard or selection of a control of the warranty interface 72 by a click of the mouse. The user also may terminate the method 100 by disconnecting from the warranty interface 72 or terminating the software of the warranty interface 72.

It will be further appreciated that the user may report deficiencies in the warranty interface 72, or request additional warranty data items 76, prioritization criteria 78, dynamic report templates 80, and/or dynamic report template criteria to the warranty groups 14. The user may report or request data via the communication system 86 of the warranty interface 72 or by any suitable communication system, such as an email or web form interface within or outside of the warranty interface, at any point in the method 100.

Additionally, it will also be appreciated that throughout the method 100, warranty data items, dynamic report templates, and analysis reports may be circulated through the communication system 86 of the warranty interface 72 or through any suitable communication system to other users or the data source 84.

It will be appreciated that the flow chart shown in FIG. 4 is exemplary, and that the invention also may be practiced with different flow chart configurations from that shown in FIG. 4. Thus, it is contemplated that the invention also may be practiced with decision block 112 and functional blocks 114 and 116 omitted. The method 100 would then progress directly from functional block 110 to functional block 118.

It is further contemplated that functional blocks 126 and 128, where the user may store the analysis report 82 and download the analysis report 82, respectively, are not required. Further, functional blocks 126 and 128 may occur within the method 100 at any point after the analysis report 82 is generated in functional block 125, and may occur in any order.

The system 70 and the method 100 have been described using warranty data items for vehicle parts. However, it will be appreciated that the invention may be practiced using any type of warranty data item.

In the preferred embodiment, the warranty groups 14 may use the system 70, and the warranty groups 14 may be available to use the system 70 on behalf of other users. It also will be appreciated that in another embodiment, the data may be provided to the warranty groups 14 in a standardized format with all relevant classifications completed so that the data can be incorporated into the warranty interface 72 without manipulation. When this is the case, the warranty groups 14 may merely maintain the warranty interface 72 and support users of the warranty interface 72.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of collecting and analyzing warranty data comprising the steps of:
   (a) providing a warranty system including a warrant interface and a storage unit, whereto the warranty system is administered by a warranty group;
   (b) displaying a representation of available prioritization data upon the warranty interface as recalled from the storage unit;
   (c) selecting prioritization data through the warranty interface;
   (d) displaying a representation of warranty data items in order of relevance to the selected prioritization data upon the warranty interface as recalled from the storage unit;
   (e) determining that a desired warranty data item is available from the representation of warranty data items;
   (f) selecting the desired warranty data item through the warranty interface;
   (g) displaying at least one dynamic report template for the selected warranty data item as recalled from the storage unit, the dynamic report templates configured to be modified by a user as desired by entering criteria through the warranty interface;
(h) determining that at least one of the dynamic report templates is adequate to perform the desired analysis of the selected warranty data item;
(i) selecting the adequate dynamic report template;
(j) entering criteria into the selected adequate dynamic report template for the selected warranty data item to create a modified report template;
(k) recalling data stored for the selected warranty data item from the storage unit and importing the data into the modified report template; and
(l) generating an analysis report, using the modified report template and the recalled data.

2. The method according to claim 1 further including, subsequent to step (l): storing the analysis report in storage.

3. The method according to claim 2 further including, subsequent to step (l): downloading the analysis report from the warranty interface.

4. The method according to claim 1 further including, subsequent to step (l): downloading the analysis report from the warranty interface.

5. The method according to claim 1 further including, at any point during the method,
adding a comment generated by the user regarding the warranty data to a discussion thread provided within the warranty interface.

6. The method according to claim 1 wherein the method is repeated upon determining that at least one of additional warranty data and dynamic report templates is desired.

7. The method according to claim 1 further including, reporting a deficiency in the warranty interface to a warranty group via a communication system of the warranty interface.

8. The method according to claim 1 wherein the system provided in step (a) includes a communication system.

9. The method according to claim 8 wherein step (e) further includes, upon determining that the desired warranty data item is not available,
reporting the lack of the desired warranty data item.

10. The method according to claim 8 wherein step (h) further includes, upon determining that the dynamic report templates are not adequate,
reporting the lack of adequate dynamic report templates.

11. The method according to claim 8 wherein step (f) includes, subsequent to a first user selecting the desired warranty data item,
determining that the analysis should be performed by a second user outside of the system, and
communicating a selected warranty data item to the second user via the communication system, with the second user entering the warranty interface to continue the method.

12. The method according to claim 8 wherein the method includes, at any point during the method,
requesting an information item selected from the group consisting of an additional warranty data item dynamic report template, and dynamic report template criteria, from the warranty group via the communication system of the warranty interface.

13. The method according to claim 12 further including, determining whether the requested item is available from the warranty group, and alerting the user to the unavailability of the requested item, upon determining that the requested item is not available from the warranty group.

14. The method according to claim 13 further including, alerting the user to the availability of the requested item from the warranty interface, when the requested item is available from the warranty interface, and
transmitting the requested item to the user, when the requested item is not available from the warranty interface.

15. A system for organizing warranty data comprising:
a storage unit adapted to receive and store a plurality of warranty data items processed by a warranty group; and
an interface adapted for access by at least one user, said interface connected to said storage unit, said interface operable upon receiving a request from said user to search said storage unit for at least one selected warranty data item, with said user selecting a warranty data item through said interface, said interface further operable to retrieve said selected warranty data item from said storage unit and retrieve a dynamic report template, said dynamic report template modified by a user as desired by entering criteria through the interface to produce an analysis report for said selected warranty data item.

16. The system according to claim 15 wherein said plurality of warranty data items are processed by the warranty group from information received from a plurality of data sources.

17. The system according to claim 16 wherein said plurality of warranty data items are produced by the warranty group from the information received from a plurality of data sources after manipulation of said information.

18. The system according to claim 17 wherein said plurality of warranty data items are produced by the warranty group from the information received from a plurality of data sources after collection and collation of said information.

19. The system according to claim 15 wherein said user is a warranty group.

20. The system according to claim 15 further including a discussion thread operably connected with said storage unit and said interface such that said user can enter comments and related data into said discussion thread, said comments being stored with related data within said storage unit for later retrieval.

21. The system according to claim 20 wherein all data entered with said discussion thread may be retrieved from the storage unit for display by said interface.

22. The system according to claim 15 wherein said interface is operable to display a plurality of dynamic report templates for said selected warranty data item, and further wherein said interface is operable to allow said user to select a dynamic report template, wherein said interface is operable to retrieve said selected warranty data item from the storage unit and import said selected warranty data item into said selected dynamic report template to produce an analysis report for said selected warranty data item.

23. The system according to claim 22 wherein said interface is operable to display a list of available criteria and allow said user to select criteria for modifying said selected dynamic report template, and further wherein said interface is operable to incorporate said criteria into said selected dynamic report template to produce a modified analysis report for said selected warranty data item.

24. The system according to claim 15 further including a communication system for communication between said user and said warranty group.

25. The system according to claim 24 wherein said user is a first user and further wherein said communication system is operable to allow said first user and said warranty group to communicate with a second user outside the system.

26. The system according to claim 24 wherein said user is a first user and further wherein said communication system is operable to transmit said selected warranty item to a second user outside of the system, such that said second user may use said system to analyze said selected warranty data item.

27. A method of collecting and analyzing warranty data comprising the steps of:
 (a) providing a warranty system including a warranty interface and a storage unit;
 (b) displaying a representation of available prioritization data upon the warranty interface as recalled from the storage unit;
 (c) selecting prioritization data trough the warranty interface;
 (d) displaying a representation of warranty data items in order of relevance to the selected prioritization data upon the warranty interface as recalled from the storage unit;
 (e) selecting the desired warranty data item trough the warranty interface;
 (f) displaying a plurality of dynamic report templates for the selected warranty data item as recalled from the storage unit;
 (g) selecting a dynamic report template, the dynamic report template adapted to be modified by criteria that may be selected as needed, wherein the data stored for the selected warranty data item is recalled from the storage unit and imported into the selected dynamic report template;
 (h) modifying the selected dynamic report template by entering criteria trough the warranty interface to modify the dynamic report template; and
 (i) generating an analysis report using the selected modified dynamic report template and selected warranty data item.

28. The method according to claim 27 wherein no criteria is selected in step (g) to modify the dynamic report template.

29. A method of collecting and analyzing warranty data comprising the steps of:
 (a) providing a warranty system including a warranty interface and a storage unit, wherein the warranty system is administered by a warranty group;
 (b) displaying a representation of available prioritization data upon the warranty interface as recalled from the storage unit;
 (c) selecting prioritization data through the warranty interface;
 (d) displaying a representation of warranty data items in order of relevance to the selected prioritization data upon the warranty interface as recalled from the storage unit;
 (e) determining that a desired warranty data item is available from the representation of warranty data items;
 (f) selecting the desired warranty data item through the warranty interface;
 (g) displaying at least one dynamic report template for the selected warranty data item as recalled from the storage unit, the dynamic report templates configured to be modified by a user as desired by entering criteria through the warranty interface;
 (h) determining that at least one of the dynamic report templates is adequate to perform the desired analysis of the selected warranty data item;
 (i) selecting the adequate dynamic report template;
 (j) modifying the selected dynamic report template based on criteria entered through the warranty interface,
 (k) recalling data stored for the selected warranty data item from the storage unit and importing the data into the modified dynamic report template,
 (l) generating an analysis report, using the modified dynamic report template and the recalled data.

30. A method of collecting and analyzing warranty data comprising the steps of:
 (a) providing a warranty system including a warranty interface and a storage unit, wherein the warranty system is administered by a warranty group;
 (b) displaying a representation of available prioritization data upon the warranty interface as recalled from the storage unit;
 (c) selecting prioritization data through the warranty interface;
 (d) displaying a representation of warranty data items in order of relevance to the selected prioritization data upon the warranty interface as recalled from the storage unit;
 (e) determining that a desired warranty data item is available from the representation of warranty data items;
 (f) selecting the desired warranty data item through the warranty interface;
 (g) displaying at least one dynamic report template for the selected warranty data item as recalled from the storage unit, the dynamic report templates configured to be modified by a user as desired by entering criteria through the warranty interface;
 (h) determining that at least one of the dynamic report templates is adequate to perform the desired analysis of the selected warranty data item;
 (i) selecting the adequate dynamic report template;
 (j) recalling data stored for the selected warranty data item from the storage unit and importing the data into the selected dynamic report template,
 (k) modifying the selected dynamic report template based on criteria entered through the warranty interface,
 (l) generating an analysis report, using the modified dynamic report template and the recalled data.

\* \* \* \* \*